Oct. 3, 1961  G. E. McENENY  3,002,353
FUEL INJECTOR FOR A COMBUSTION CHAMBER
Filed Dec. 19, 1957
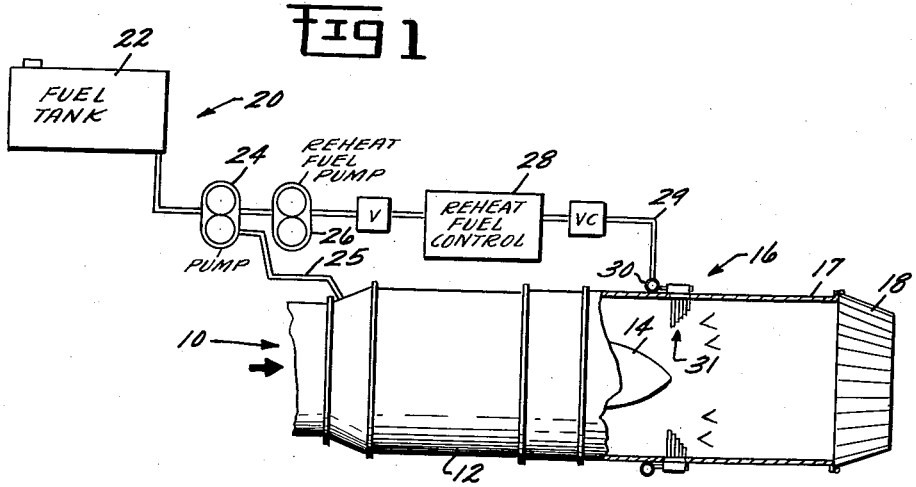
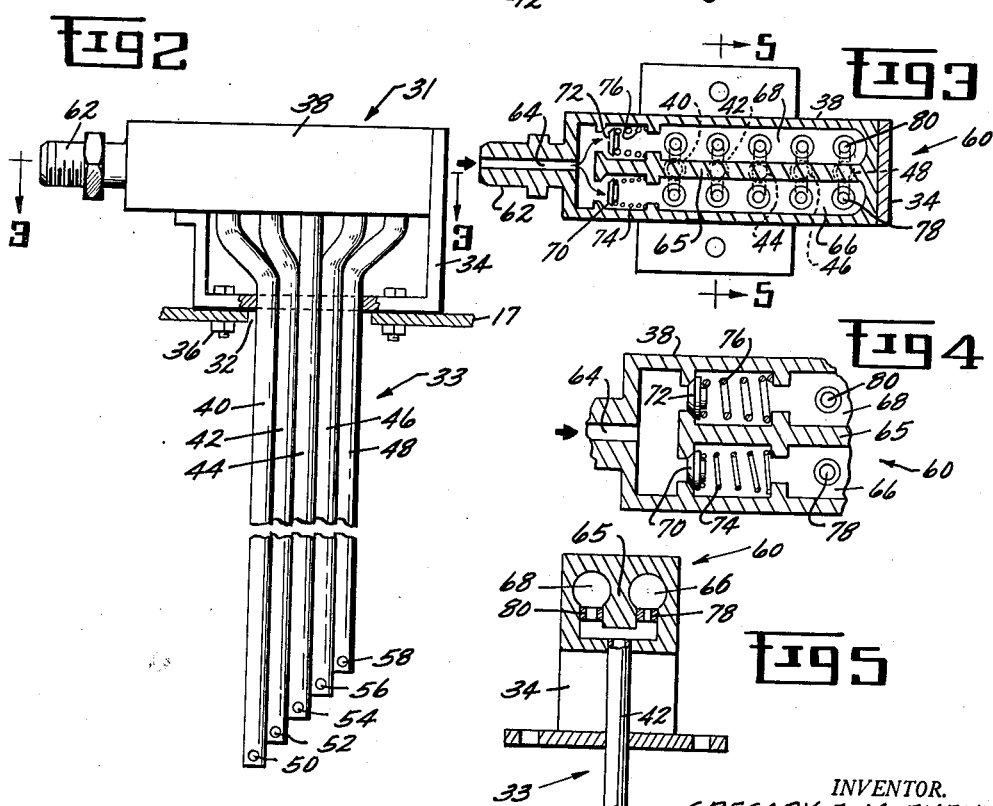
INVENTOR.
GREGORY E. McENENY
BY
Maurice H. Klitzman
ATTORNEY—

2

3,002,353
Patented Oct. 3, 1961

3,002,353
FUEL INJECTOR FOR A COMBUSTION CHAMBER
Gregory E. McEneny, Cincinnati, Ohio, assignor to General Electric Company, a corporation of New York
Filed Dec. 19, 1957, Ser. No. 703,981
6 Claims. (Cl. 60—39.74)

This invention relates to a fuel injector for a combustion chamber of a gas turbine engine, and in particular, to a wide flow range fuel injector for injecting fuel into a combustion chamber of an aircraft gas turbine engine.

In an aircraft gas turbine engine, air passes through a compressor where it is compressed, and then passes into a combustor where fuel is added by a main fuel system for the combustion process. The hot gases then pass downstream through a turbine which is designed to take sufficient energy out of the hot gases for driving the compressor. If the engine is a turbojet, the hot gases then pass through an exhaust nozzle where the remaining energy in the gases provides thrust for the engine. Since the turbine cannot withstand extremely high temperatures, the temperature of the hot gases coming out of the combustion chamber must be limited. Therefore, complete burning is undesirable. As a result a large amount of uncombined or excess air passes out through the exhaust nozzle to the atmosphere. This excess air represents available energy for more thrust.

Therefore, in order to obtain more thrust from an aircraft gas turbine engine, with a minimum amount of weight penalty, it has been common practice to attach an afterburner to the turbine frame to burn the uncombined air. An afterburner is merely an additional combustion chamber for an additional combustion process. The afterburner is provided with fuel from an afterburner or reheat fuel system to mix with the excess air for the additional combustion. For purposes of this invention a reheat fuel system is intended to cover a fuel system which is in addition to the main fuel system and is operated only during afterburner operation.

Stoichiometric combustion is one in which exact amounts of fuel and air are chemically combined to make the combustion reaction complete. In order to obtain the most efficient burning, it is important that the combustion process be near stoichiometric. However, in combustion chambers, where gas velocities are very high, gas flows large, and the combustion process near stoichiometric, conventional types of injection nozzles cannot be effectively employed. This is particularly true in the afterburners of aircraft gas turbine engines, and in some annular combustion chambers of the main combustion system in aircraft gas turbine engines. Present fuel injectors do not effectively mix the fuel with air to obtain near stoichiometric combustion. The conventional types of fuel injection systems cannot satisfactorily provide the wide flow range required for the high fuel flow rate, high pressure condition and for the moderately low fuel flow rate, low pressure condition. If the fuel injection system is designed for maximum thrust producing conditions, (high flow rate, and high temperatures) it will not be efficient for the low thrust condition (low flow rate and low temperature). During high speed or high mach flight conditions, the temperature of the fuel, before it enters the afterburner, may be in the order of 200° F.–400° F. Therefore, the minimum allowable fuel pressure to suppress fuel boiling is high. At low flow rates the fuel pressure is not sufficient to maintain the fuel above its boiling point. If a fuel system were used where a single manifold and single set of spray bars forms the fuel system, the orifices must be designed for the maximum flow condition. When this is done, the fuel pressures become exceedingly low at minimum flow. Since the temperature of the incoming gases in the afterburner is high, and since the pressure of the fuel is not sufficiently high at the minimum flow condition, the fuel vaporizes or boils. Also, at the low pressure condition, maldistribution of fuel to the various orifices results since the pressure is too low to provide the same flow to the orifices in the fuel injectors located at the top of the combustion chamber as compared to the orifices in the fuel injectors at the bottom of the combustion chamber.

In an attempt to provide a fuel system capable of injecting fuel into a combustion chamber over a wide range of operating conditions, for example, high fuel flow rates and stoichiometric burning as well as low fuel low rates with low temperatures, present day systems use what is commonly referred to as a duplex reheat fuel system. Such a prior art system is found in application Serial No. 513,260, filed June 6, 1955, now Patent No. 2,975,589, and assigned to the same assignee as this application. In such duplex reheat fuel systems, two sets of fuel injection nozzles are provided which extend into the combustion chambers. The two sets of fuel injection nozzles are interconnected in parallel by a flow divider which normally admits fuel to one set of nozzles at minimum flow and both sets at high flows and high pressure. In such systems, spray bars are generally used instead of conventional fuel injection nozzles, since the spray in the shape of a cone from a conventional fuel nozzle would be immediately collapsed in the 900–1000 ft./sec. flow stream, which is common in afterburners. Previous methods have attempted to insure controllable fuel distribution by using the simple spray bar arrangement in a duplex system.

The spray bar is simply an elliptical or circular tube which is placed in the combutsion chamber normal to the axis of the engine. It has a series of small holes along its length so arranged that generally the fuel is injected into the air stream perpendicularly to the stream in the spray bar. A series of these spray bars are interconnected by a manifold and are placed around the inside of the afterburner in numbers varying from 20 to 40 in number and project radially inwardly. With possibly ten holes per spray bar and approximately 40 spray bars, a total of 400 individual points of fuel injection are obtained with which fuel distribution may be obtained. Furthermore, the point at which the fuel may be injected into the gas stream is generally found experimentally by simply locating the holes to conform with a particular combustion chamber mass flow distribution. The mass flow distribution across a combustion chamber is not uniform. This is due to the flow in the combustion chamber being maldistributed. In the case of an afterburner, the flow of hot gases coming from the turbine has some turbulence. However, the flow distribution can be measured experimentally by inserting pressure probes at a plurality of radial locations. A greater number of orifices for injecting fuel into the stream will be concentrated in the area where the mass flow distribution is determined to be the greatest. Therefore, maximum combustion efficiency can be attained by painstakingly matching and adjusting the spray bar hole pattern to the particular gas stream mass flow distribution.

Prior duplex reheat systems have inherent difficulties operating over wide range operating conditions. The orifices in the spray bars are designed to have a flow characteristic equivalent to that of a simple orifice, that is, the flow varies as the square root of the differential pressure. Therefore, to obtain a fuel flow range in lbs./hr. of 10 to 1, typically in present afterburners, a pressure range of 100 to 1 is necessary. This pressure range requires an exceedingly large fuel pump. Also, the flow range requirements for future afterburners is steadily increasing. Further, orifices in the spray bars of duplex systems are used to meter the flow. The pressure drop across these orifices is high and the corresponding total orifice area is small. Therefore, in order to obtain good fuel distribution, it is necessary to provide a large number of points of fuel injection. As a result, very small holes are required which are difficult to machine. Also, a spray bar with many small fixed orifices does not have wide flow range capabilities. Further, the small orifices in spray bars in the secondary manifold of a duplex system, have the tendency to coke and gum when not in use. Since these openings frequently become plugged it necessarily results in poor performance. Furthermore, with the small orifices in the spray bar metering the fuel at various radial locations within the afterburner combustion chamber, fuel maldistribution often results. The fuel at one end of the spray bar has more distance to travel to its metering orifice than does the fuel at the other end of the spray bar. This results in some fuel having a longer residence time in the spray bar where it is subjected to high temperatures existing within the combustion chamber. This causes the fuel to vaporize or boil. Maldistribution results under these conditions since a greater weight of liquid fuel is delivered through an orifice than vaporous fuel for a given spray bar fuel pressure.

The above duplex reheat fuel systems are not only complex and heavy but also have inherent operational shortcomings. Duplex systems generally use flow dividers to switch in or cut out the secondary flow system. When the flow divider cracks for the secondary system to barely open, the flow in the second system is at low pressure so that the flow does not distribute equally to all points in the secondary manifold. This problem results since the spray bars at the bottom of the combustion chamber receive more flow than the spray bars at the top.

In its mode of operation, the duplex system works in opposition to the combustion requirements of an aircraft gas turbine. That is, at the high altitude, low pressure and low fuel flow conditions, where the combustion problems are the worst and the need for complete fuel distribution is the most urgent, such a system is operating only on the primary leg of the duplex system with the smallest number of spray bars. This is not satisfactory since the fuel is not being effectively distributed in the afterburner.

In addition, a fuel boiling problem is created with the duplex system during low pressure conditions in the secondary manifold when the flow divider barely cracks. By the time this relatively low pressure fuel reaches the orifices in the secondary manifold, the high ambient temperatures will create boiling. Therefore, high pressure requirements, to prevent fuel boiling at low flow rates, is a necessity which has not been met by the present day duplex reheat fuel systems.

Another type of fuel injection nozzle that has been used is the variable area fuel injection nozzle. This is a nozzle that has moving parts to vary the orifice area and thereby provides a wide fuel flow range. However, such a fuel injection nozzle has poor reliability in a high temperature environment in view of the differential thermal expansions of the moving parts. Such nozzles also create large obstructions in the high velocity gas stream and create undesirably large pressure losses. Spray bars, on the other hand, provide less blockage area to the high velocity stream, and therefore, less pressure loss or pressure drop.

It is well known in prior art fuel systems to provide check valves between the fuel injectors in the combustion chamber and the fuel pump. These are generally used to prevent the escape of the fuel into the combustion chamber when the fuel system is not in operation, or to prevent back flow of gases into the fuel system. However, these check valves are not positioned in such a manner to equally distribute the flow to the fuel injectors. The fuel injectors at the bottom of the combustion chamber receive more fuel than the fuel injectors at the top.

In copending application Serial No. 705,266, now Patent No. 2,978,870, assigned to the same assignee as the present application, a spring loaded valve is provided for each spray bar assembly and located outside of the combustion chamber to accomplish fuel metering in order to avoid temperature effects encountered in a high ambient temperature. The location of the spring loaded valve outside of the combustion chamber, insures a sufficient fuel pressure in the manifold connecting each of the spray bars to suppress fuel boiling or vaporization. Also, disclosed in the copending application is the enlargement of the orifices in the spray bar to a relatively large size to decrease the pressure drop so as to have substantially no resistance to flow, and to also act as distributing orifices rather than metering orifices where there would be a high pressure drop or high resistance to flow. This decreases the resistance to flow so that if any vaporization of the fuel takes place it will not affect the volume flow. When using the small metering orifices the fuel vaporization conditions cause an insufficient amount of fuel to pass to meet the design conditions. This is due to the vapor occupying a larger volume than the equivalent weight of liquid fuel. Another feature of the copending application is in the use of multiple tubes each having a relatively large opening in place of the single tube with multiple openings. The orifices, and therefore, the tubes, extend to a different radial location to match the mass flow distribution through the combustion chamber. This assures that the amount of fuel delivered to each tube from a location external of the combustion chamber will pass through the relatively large distributing opening in the tubes whether it be in a liquid, liquid-vapor, or vaporous condition.

It is a general object of this invention to provide another means for insuring that there be homogeneous fuel at each of the fuel injectors under sufficient pressure to suppress fuel boiling, split up the homogeneous fuel into equal segments or portions and to pass each of the portions through a tube into the combustion chamber with substantially no restriction to the fuel flow.

It is another object of this invention to provide a fuel injection system for a combustion chamber for an afterburner of an aircraft gas turbine engine in which a spray bar assembly is provided having a plurality of tubes, and each of the tubes having an enlarged distributing opening positioned at a different radial location from an adjacent opening, and valve means is provided to not only provide flow over a wide range of flow conditions, but to insure that homogeneous fuel flow is provided around the circumference of the combustion chamber before entering into the valve means, and the valve means contains metering orifice means to insure an equal split of the homogeneous fuel, so that each of the tubes receives an equal or designed amount of fuel.

It is another object of this invention to provide a wide range flow valve means for a spray bar assembly in a combustion chamber in which a portion of the fuel is split into a number of equal homogeneous parts under a first range of operating conditions, and under a second range of operating conditions another portion of the fuel is split into a number of equal homogeneous parts, and the valve means is constructed so that one of these parts from the second operating condition will combine with and supplement a part of the first operating condition.

Briefly stated, and in accordance with one aspect of this invention, I provide a plurality of radially extending fuel injectors located about the circumference of the combustion chamber of a gas turbine engine, the fuel injectors being in the form of spray bar assemblies, with a spray bar assembly being divided into a plurality of tubes each having an opening positioned at a different radial location from an adjacent opening, the opening being relatively large for distributing the fuel rather than metering the fuel so as to provide substantially unrestricted flow at the appropriate radial location, and a wide range valve means for each spray bar connected to the tubes provided with a spring loaded valve to insure homogeneous flow about the circumference of the combustion chamber prior to entrance into the valve means, and a primary chamber having a set of metering orifices in series with the spring loaded valve, there being one orifice for each tube, the orifice having a relatively high resistance to flow to insure that the homogeneous fuel is controlled in a desired manner so that each of the tubes receives the desired amount of fuel; and a secondary chamber having a set of metering orifices in series with another spring loaded valve mounted in the valve means in parallel relation with the first valve so as to open under higher fuel pressures for higher flow rates, there being one orifice for each tube, the metering orifices in the secondary chamber being arranged to split the homogeneous fuel flow in a controlled desired manner so that when the first spring loaded valve opens, fuel is split only with respect to the primary chamber and when the pressure of the fuel is increased to a sufficient extent the secondary valve leading to the secondary chamber opens so that the orifices in the secondary chamber split the homogeneous fuel, at which time both the primary and secondary chambers feed fuel to the orifices and one orifice from each of the chambers feeds fuel into a single tube.

These and other objects will become more apparent when read in the light of the accompanying specification and drawing wherein the parts are referred to specifically but are intended to be applied as generically as the prior art will permit, and wherein:

FIGURE 1 shows the aft end of a gas turbine engine with a typical reheat fuel supply system which could be used in connection with this invention.

FIGURE 2 is an enlarged view of a fuel injector in accordance with this invention.

FIGURE 3 is a cross sectional view showing the valve means or flow divider taken on lines 3—3 of FIGURE 2, showing the primary and secondary chambers with the metering orifices connected to the tubes.

FIGURE 4 is an enlarged view of FIGURE 3 partially in broken section.

FIGURE 5 is a cross sectional view taken on lines 5—5 of FIGURE 3, showing the primary and secondary chambers of the valve means and one pair of the metering orifices for supplying fuel to one of the tubes.

Referring to FIGURE 1, a typical reheat system is shown merely by way of example in combination with the afterburner of an aircraft gas turbine engine. However, it is recognized that the invention could be used with any annular combustion chamber. The aft end of the aircraft gas turbine engine is generally referred to by the numeral 10 having a combustion chamber 12, exhaust cone 14 and an afterburner or combustion chamber generally referred to by the numeral 16. The afterburner 16 includes an afterburner casing 17 and an afterburner exhaust nozzle 18.

In order to obtain more thrust from the engine, a reheat fuel sytem 20 is provided for supplying fuel to the afterburner 16 so as mix with the unburned air in the hot gases passing from the main combustion system for additional burning. The fuel system 20 includes a fuel tank 22 and main fuel pump 24 for delivering fuel to the conduit 25 to the main combustion system. A reheat fuel pump 26, a reheat control valve 28, and a conduit 29 is provided for delivering fuel to a manifold 30 which interconnects a plurality of fuel injectors 31 for injecting fuel into the afterburner 16. A check valve identified at V-C is positioned in line 29 to prevent fuel from draining from control 28 when the reheat fuel system is not in operation. Any number of fuel injectors may be used in order to provide satisfactory performance of the afterburner. However, only one of these will be described and it is understood that the others are similar in construction.

Reference is now made to FIGURES 2 and 3 which show an enlarged view of a fuel injector constructed in accordance with this invention. An opening 32 is provided in the afterburner casing 17 for receiving the fuel injector 31. The fuel injector consists of a spray bar assembly 33 which is constructed so as to provide the least amount of obstruction to the flow and thereby maintain the pressure drop or pressure losses, in the combustion chamber at a minimum. The spray bar assembly 33 is positioned in the opening 32 so as to extend radially into the afterburner or combustion chamber 16. In order to rigidly support the fuel injector on the casing 17, a bracket 34 is provided which is secured to the afterburner casing 17 by bolts, rivets, welding, brazing or other attaching means as shown at 36. The spray bar assembly 33 includes a plurality of different length fuel injection tubes 40, 42, 44, 46, and 48. Each of the tubes are provided with a relatively large fuel distributing opening 50, 52, 54, 56, and 58 so as to have a low pressure drop and provide substantially no resistance to flow. The fuel distributing openings are positioned at the proper radial location to match the particular mass distribution in the combustion chamber. It is important to note that these fuel distributing openings are not metering orifices having large pressure drops in the normal sense of the term as used in the duplex reheat fuel system described previously, but are merely distributing openings having substantially no pressure drop.

In order to provide the same amount of fuel at any circumferential point about the combustion chamber casing within the manifold 30, each of the spray bar assemblies 33 is provided with a valve assembly 38 as shown in FIGURES 3 and 4. The valve assembly is provided with a main valve body which is closed at one end and at the other end is provided with a fluid coupling 62. The fluid coupling is provided with an opening 64 to receive fuel from the conduit 29 and manifold 30. The valve body is provided with a partition 65 so as to form two chambers, a primary chamber 66 and a secondary chamber 68. A valve is provided for each chamber one being referred to as a primary valve 70 and the other as a secondary valve 72. The primary valve 70 is provided with a spring 74 which is designed to have a smaller spring rate than the spring 76 for the secondary valve 72. The primary valve is set to open at a lower fuel pressure than the secondary valve. In order to insure that the fuel is under equal pressure in the manifold 30 around the complete circumference of the combustion chamber, the spring 74 is set to permit the valve 70 to open at a predetermined pressure. For example, an inlet fuel pressure of 50 p.s.i.g. can be maintained at the fuel injector. This would be below a spring cracking pressure which can be set at 80 p.s.i.g. This arrangement will meter the flow through the primary valve 70 whenever the inlet pressure is above 80 p.s.i.g. and thereby provides the same amount of fuel flow into each valve.

Whenever it is desirable to cover a wider range of fuel flow the secondary valve 72 is adapted to open at a higher pressure. For example, the spring 76 could be set to open the valve at 100 p.s.i.g.

The primary chamber 66 is provided with a plurality of metering orifices 78, there being one orifice for a tube. The purpose of these orifices 78 is to split the fuel equally at a location where there is a homogeneous fuel, that is, where the fuel is all liquid without any vaporization having taken place. The orifices 78 will insure an equal distribution of fuel between them since they are made relatively small so as to have a relatively large pressure drop and thereby provide a large resistance to flow so as to result in adequate fuel pressure upstream of the orifices to prevent fuel vaporization. This insures that an equal quantity of fuel will flow to each of these metering orifices. The secondary chamber 68 is also provided with a plurality of metering orifices 80, there being one orifice for each tube. The secondary metering orifices come into play whenever it is desirable to obtain a wider flow range for higher rates of flow. Therefore, when both chambers are used each tube is connected to one orifice from the primary chamber and one from the secondary chamber as best seen in FIGURE 5.

When it is desirable to operate the reheat system, the reheat fuel pump 26 is energized to deliver fuel to the reheat fuel control 28. The reheat fuel control provides the proper amount of fuel to the conduit 29 at the pressure necessary to overcome the flow resistance of the system. The fuel is then delivered to the manifold 30. Since the primary spring 74 is designed to permit the poppet valve 70 to open under a predetermined pressure, the fuel pressure in the manifold will be sufficient to suppress boiling or vaporization in the manifold so that the fuel will be homogeneous, that is, all in a liquid state. There will be an equal amount of fuel at the fuel ejectors 31 about the complete circumference of the combustion chamber since the fuel ahead of the poppet valve 70 is under high pressure.

When the fuel pressure in the manifold 30 builds up to a predetermined amount, it will crack open the valve 70 so as to provide homogeneous fuel to the primary chamber 66. Since the metering orifices 78 are designed to have a relatively high pressure drop, the resistance to the fuel flow will insure that the fuel will still be homogeneous so that the flow will be split equally. Therefore, each of the tubes 40-48 will receive an equal amount of fuel. The distributing openings 50-58 are made relatively large so as to have a small pressure drop so as to have substantially no resistance to flow. This insures that an equal amount of fuel will be delivered to the combustion chamber through each of the orifices even though the fuel should vaporize or boil. The distributing openings are sufficiently large so that it will pass the amount of fuel desired regardless of its non-homogeneous condition of liquid and vapor.

The valve assembly 60 is capable of a wide range of fuel flows by providing a secondary chamber adapted to operate in parallel with the primary chamber. If higher thrust is required, the reheat fuel control 28 will be operated to provide more fuel under higher pressure to the manifold 30 so as to open the valve 72. When this occurs, the metering orifices 80 will split the fuel equally among the tubes so as to supplement the fuel being delivered by the primary chamber. When both the primary and secondary flow paths are in operation each tube will receive fuel from one metering orifice in the primary chamber and one metering orifice in the secondary chamber.

As a result of this arrangement, the fuel in the spray bar assemblies will be delivered at equal or designed amounts at the different radial locations as desired even though the fuel may be non-homogeneous.

While a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to secure by Letters Patent of the United States is:

1. A combustion chamber having a casing supporting a plurality of fuel injectors positioned about the casing, the fuel injectors being interconnected by a manifold for receiving fuel, each of the fuel injectors comprising a spray bar assembly and a valve means, the spray bar assembly including a plurality of fuel injection tubes connected directly to the valve means, the valve means including a valve body having a spring loaded valve and a plurality of metering orifices in series with the valve, there being an orifice for each tube, the metering orifices having a large resistance to flow to insure equal distribution of fuel to each of the tubes, the valve being arranged to open at relatively high pressure so as to insure homogeneous fuel in the manifold upstream of the fuel injector.

2. A combustion chamber having a casing and a plurality of fuel injectors positioned about the casing for injecting fuel at a plurality of radial locations, the fuel injectors being connected by a manifold for receiving fuel, each of the fuel injectors comprising a spray bar assembly and a valve means, the spray bar assembly including a plurality of tubes, the valve means including a valve body having a first spring loaded valve and a plurality of metering orifices in series with the valve, and a second spring loaded valve, a plurality of orifices in series with the second valve, there being one orifice from each set of orifices for each tube, the first valve being arranged to open at relatively high pressure so as to insure homogeneous fuel in the manifold, the metering orifices having a large resistance to flow to insure equal distribution of the fuel to each of the tubes, the second spring loaded valve and the second series of orifices becoming operative when subjected to a higher pressure than that required to open the first valve.

3. A wide flow range fuel injector having a spray bar assembly and a valve means, the spray bar assembly including a plurality of tubes, the valve means having parallel flow paths to the tubes, each path having a valve and a set of metering orifices, there being one orifice from each flow path connected to a tube, each valve having a spring of different spring rates so that during relatively low pressure operating conditions one flow path is opened and the fuel is split into equal portions by the metering orifices, and at high pressure operating conditions a second flow path is opened through a parallel set of metering orifices and the fuel in the parallel set is split into equal portions by the metering orifices so as to cooperate with the orifices in the first flow path to supply fuel to the tubes.

4. A fuel injector for a combustion chamber comprising a spray bar assembly and a valve means, the spray bar assembly including a plurality of tubes, the valve means including two sets of orifices, means for providing fuel flow to one set under one pressure and means for providing fuel flow to the other set under another pressure, there being one orifice from each set of orifices connected to a tube, so that under one operating condition one set of orifices feeds fuel to the tubes and under another set of operating conditions the two sets of orifices feed fuel to the tubes.

5. A combustion chamber comprising a plurality of fuel injectors, each fuel injector including a spray bar assembly and a valve means, the spray bar assembly including a plurality of tubes, each tube having a low pressure drop opening located at a different radial position from an adjacent opening, the valve means including two sets of orifices, the orifices having a high pressure drop so as to split the fuel equally, the two sets of orifices being positioned to operate in parallel so that under one operating condition one set of orifices supplies equal amounts of fuel to the tubes and under another set of conditions the both sets of orifices supply equal amounts of fuel to the tubes.

6. A fuel injector for a combustion chamber comprising a spray bar assembly for operation in a high ambient temperature, and a valve means, the spray bar assembly including a plurality of tubes each having a low pressure drop opening providing substantially unrestricted flow, the valve means including two sets of orifices, means for opening the one set under one pressure and means for opening the other set under another pressure, there being one orifice from each set of orifices connected to a tube, so that under one operating condition one set of orifices feeds fuel to the tubes and under another set of operating conditions the two sets of orifices feed fuel to the tubes.

References Cited in the file of this patent

UNITED STATES PATENTS

| | | |
|---|---|---|
| 2,536,440 | Greenland | Jan. 2, 1951 |
| 2,622,610 | Rowe et al. | Dec. 23, 1952 |
| 2,851,859 | Foure | Sept. 16, 1958 |